Figure 1:
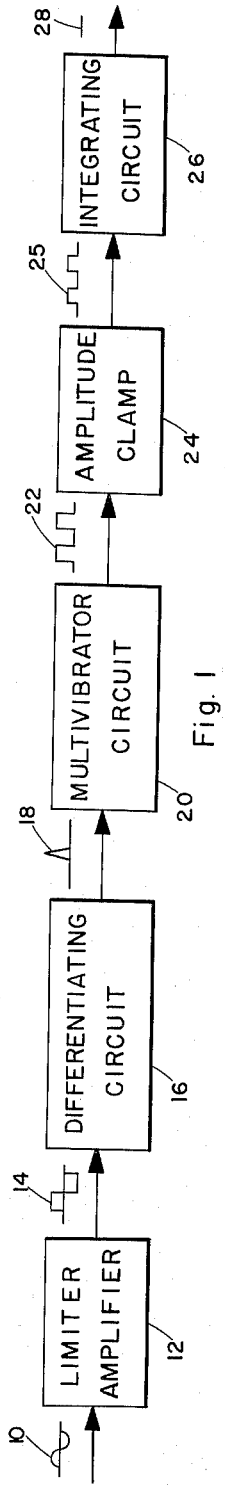

Dec. 7, 1965  F. H. WILLARD ETAL  3,222,550
PULSE WIDTH STABILIZED TRANSISTOR MULTIVIBRATOR
Filed Jan. 14, 1964

INVENTORS
FRANK H. WILLARD
JAMES A. POLLARD
BY
Knox & Knox

United States Patent Office 3,222,550
Patented Dec. 7, 1965

3,222,550
PULSE WIDTH STABILIZED TRANSISTOR
MULTIVIBRATOR
Frank H. Willard, 1046 Pacific Beach Drive, and James
A. Pollard, 4107 Loma Alta Drive, both of San Diego,
Calif.
Filed Jan. 14, 1964, Ser. No. 337,650
4 Claims. (Cl. 307—88.5)

This invention relates generally to multivibrators and particularly to a monostable multivibrator including circuitry for pulse width stabilization regardless of changes in temperature and supply voltage and variations in transistor characteristics.

This application is a continuation-in-part of copending application, Serial No. 100,102, filed April 3, 1961, for improvement in a Transistorized Multivibrator, now abandoned.

Multivibrators have many uses, one of which is in Doppler radar navigation equipment, wherein it is important to accurately measure the frequency of received signals. This measurement is particularly important because the frequency of the received signal is used to indicate the speed or distance of a target.

As indicated above, one method of measuring the frequency uses a circuit known as a monostable multivibrator. This circuit has one stable state in the absence of an input signal. When an input signal is applied, the circuit shifts to another state; then returns to the stable state after the input signal is removed. In shifting from one state to the other, the circuit produces pulse type output waveforms that correspond with the change of state. These pulses may be then converted into a D.C. signal whose magnitude is a measure of frequency of the input signal.

In an attempt to miniaturize and lighten the circuitry, transistors are used, but unfortunately transistors are inherently temperature sensitive. As aircraft change altitude or otherwise pass through changing temperature conditions, transistor current and the circuit output vary, thus producing inconsistent results. The same changes result when supply voltages change. Further, in transistors of the same type, characteristics vary so that substituting transistors often produces inconsistent results.

Most attempts to solve the foregoing problems have introduced complex circuitry that has either "loaded down" the multivibrator or the differentiator input circuit to the multivibrator, either effect being unsatisfactory because undesirable waveform distortions are produced.

It is, therefore, the principal object of this invention to provide an improved multivibrator circuit capable of producing output signals of consistently uniform pulse width regardless of changes in temperature, supply voltage, or transistor characteristics.

Figure 2:
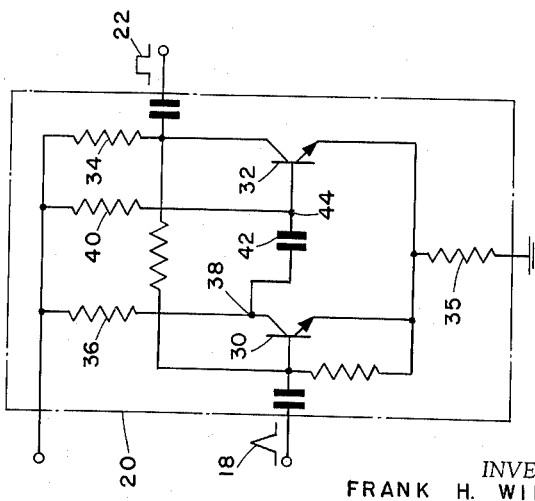

The attainment of this object and others will be realized from the following specification, taken in conjunction with the drawing of which:

FIGURE 1 shows the overall circuit;
FIGURE 2 shows a prior art transistorized multivibrator; and
FIGURE 3 illustraes the multivibrator circuit of the instant invention.

In FIGURE 1 an incoming signal 10 has a given number of cycles per second which is a measure of the frequency. This signal is applied to a limiter amplifier 12 containing circuitry that amplifies the signal, clips off the top and bottom, amplifies the remainder, repeats the clipping action, etc., until it produces a signal 14 that has the same frequency as the incoming signal 10 but is in the form of rectangular pulses that have precipitous sides. Signal 14 is applied to a differentiator circuit 16 that produces an output signal 18 comprising an upwardly extending, or positive-going, "spike" for each upwardly extending side of each rectangular pulse and produces a downwardly extending or negative-going spike for each downwardly extending side of each rectangular pulse. Waveforms 10, 14 and 18 tend to be symmetrical about a reference level. Waveform 18 is applied to a multivibrator 20, that is designed to be energized by only one type of spike as illustrated, the negative going spike having been eliminated.

As previously explained, a multivibrator has two states, and the type used in our invention tends to remain in one state known as the stable state, producing no output signal until it is triggered by a spike. The multivibrator then quickly shifts to its second state producing an output signal 22 having a high level . Multivibrator 20 remains in its second state for an interval that is established by circuit parameters after which it shifts back to its stable state and remains there until triggered by another spike. Thus the circuit vibrates between its two states. The triggering spikes of waveform 18 thus cause multivibrator 20 to produce waveform 22 comprising a series of rectangular pulses whose frequency correspond to that of the incoming signal 10 and whose amplitude and duration depend upon the multivibrator circuitry. Waveform 22 has pulses that are all above a given reference level.

Rectangular waveform 22 is then passed through an amplitude clamping circuit 24 that causes each pulse 25 to emerge with exactly the same amplitude. These equal amplitude pulses 25 are then applied to an integrating circuit 26 that produces a D.C. signal 28, the amplitude of which is a measure of the frequency of incoming signal 10.

If the frequency of signal 10 increases, more spikes-per-second are produced, waveform 22 has more pulses per second, the level of output signal 28 is increased, and a utilization device, such as a meter, has its pointer deflected to a greater extent.

As previously explained, many present-day multivibrator circuits are transistorized, and one such circuit is shown in FIGURE 2. Here multivibrator 20 comprises two transistors 30 and 32. In the stable state of the multivibrator, transistor 30 is non-conductive, and transistor 32 is conducting at full capacity. The current flowing through load resistance 34 therefore produces a feedback signal but no output.

A momentary positive-going spike 18 applied to the base electrode of transistor 30 causes it to conduct, and increased current through resistance 35 cuts off transistor 32 so that the multivibrator quickly shifts to its second state wherein transistor 30 is conductive and transistor 32 is non-conductive. The lack of current through resistance 34 causes the output signal to have a relatively high level, thus producing the precipitous upwardly directed side of the output signal 22. As soon as transistor 30 becomes conductive, current flows through resistance 36 and the potential at point 38 is lowered. This means that current flows through resistance 40 and into and out of capacitance 42 to point 38 causing the charge in capacitance 42 and the potential at point 44 to increase in an "exponential" manner. This increasing potential is applied to the base electrode of transistor 32, and when the potential at point 44 exceeds a given value, it causes transistor 32 to become conductive. This, due to the negative feedback through resistor 46 causes the multivibrator to return to its stable state, the return producing the precipitous downwardly extending side of the output pulse and the stable state again producing the low level of the output pulse.

As may be understood, the duration of the output pulse depends upon the rate at which capacitance 42 charges up and upon the point at which transistor 32 becomes conductive, this rate depending primarily upon the rate of potential increase at point 38 and the conductivity point depending upon transistor 32.

As previously explained, changes of temperature and supply voltage vary the operating currents of transistors. This means that the current through transistor 30 will vary with temperature, causing the potential at point 38 to increase in an inconsistent manner. Also the point at which transistor 32 becomes conductive and non-conductive will also vary, thus introducing another inconsistency. Furthermore, changes in temperature also vary the point at which transistor 30 becomes conductive and non-conductive. All of these factors affect the duration of the output pulse, and thus the level of the signal applied to the utilization device.

Figure 3:
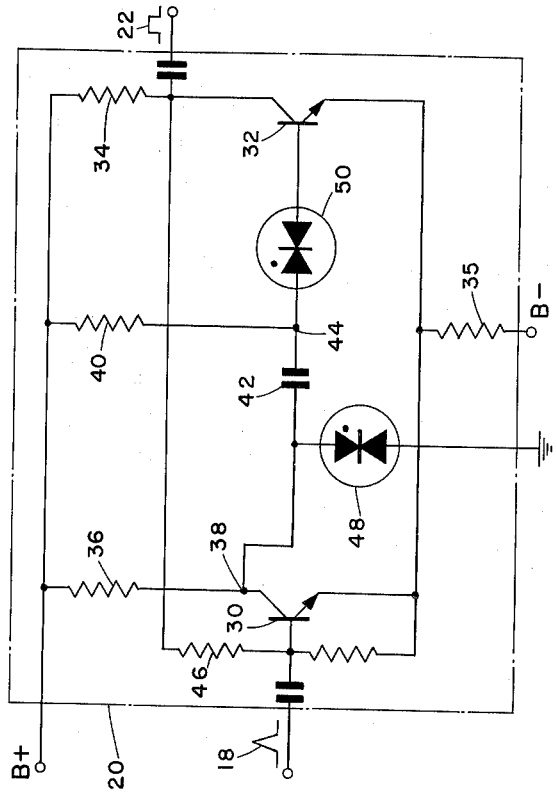

Referring now to FIGURE 3, there is shown the basic concept of our invention to overcome the above shortcomings. In FIGURE 3, a double back-to-back zener diode 48 is connected between point 38 and ground providing a charge-discharge path for capacitance 42. Now when transistor 30 is conductive, current flows through resistance 36. The potential at point 38 now drops. At a predetermined value, zener diode 48 becomes conductive, bypassing transistor 30, and clamps point 38 at that potential thus establishing a lower potential level for point 38.

When transistor 30 becomes non-conductive and the potential at point 38 rises, double zener diode 48 again becomes conductive in the opposite direction and clamps point 38 to this second potential. Thus point 38 varies between two predetermined potentials. As a result, capacitance 42 is always exposed to the same charging potential range and, therefore, always charges up along exactly the same exponential curve independently of nonlinear current variations in transistor 30. In addition, the time constant determined mainly by resistor 40, capacitor 42 and double zener diode 48 is selected so that only the linear portion of the exponential charge curve is effective. Furthermore, if a new transistor were substituted for transistor 30, due to zener diode 48, point 38 would still vary between the same two potentials and capacitance 42 would still charge up along exactly the same exponential curve.

In order to still further assure uniform operation, the direct connection between point 44 and transistor 32 is replaced by a second double zener diode 50 in the discharge path of capacitance 42. When the potential at point 44 is raised by the charge in capacitance 42, it eventually reaches a predetermined value at which zener diode 50 suddenly becomes conductive and thus discharges capacitance 42 and applies a triggering signal to initiate conductivity in transistor 32. Due to the action of zener diode 50, the same triggering potential is always applied by zener diode 50 at the same point as established by zener diode 48, capacitance 42 and zener diode 50. Double zener diode 50 also eliminates all leakage current below the triggering potential.

Since zener diodes are relatively immune to temperature variations, our invention provides the lightweight compactness of a transistorized multivibrator and required temperature stability.

While our invention has been described in terms of NPN transistor circuitry, it is of course possible to use other suitable transistors or circuit elements.

It is understood that minor variation from the form of the invention disclosed herein may be made without departure from the spirit and scope of the invention, and that the specification and drawing are to be considered as merely illustrative rather than limiting:

We claim:

1. In a transistorized multivibrator circuit including a timing capacitor, the combination comprising:
   a D.C. source;
   a first transistor having a collector;
   a resistor having one end connected to said D.C. source and the other end connected to said collector;
   means in the charge-discharge path of said capacitor ensuring that said capacitor consistently charges linearly to a predetermined charge level and discharges to a predetermined discharge level, said means including a double back-to-back zener diode having one terminal connected to the juncture of said collector, said other end of said resistor and one terminal of said capacitor, and having the other terminal connected to ground, so that said double back-to-back zener diode conducts at fixed and equal positive and negative potential levels to maintain the charge and discharge levels independently of nonlinear current changes in said first transistor;
   means connected to the other terminal of said capacitor ensuring that said capacitor consistently starts to discharge at the same charge level; and
   a second transistor having a base, said base being connected to the last mentioned means to discharge said capacitor abruptly when said discharge path is closed by said last mentioned means.

2. Apparatus according to claim 1 wherein the second mentioned means includes a double back-to-back zener diode having one terminal connected to said base and the other terminal connected to said other terminal of said capacitor so that said double back-to-back zener diode cuts off all leakage current to said base below said charge level and conducts to start discharging said capacitor at said charge level independently of inconsistent triggering levels of said second transistor.

3. In a transistorized multivibrator circuit, the combination comprising:
   a D.C. source;
   a first transistor having a collector and an emitter;
   a load resistor connected between said collector and said D.C. source;
   a second transistor having a base and an emitter;
   a resistor connected between said emitters and said D.C. source;
   a timing circuit including a resistor and a capacitor connected in series between said collector and said D.C. source;
   a first double back-to-back zener diode connected between said collector and ground whereby the upper and lower potential levels of said collector and the upper and lower charge levels of said capacitor are fixed; and
   a second double back-to-back zener diode connected between the juncture of said resistor and said capacitor of said timing circuit and the base of said second transistor whereby said second transistor conducts when said second double back-to-back zener diode becomes conductive at a predetermined value of potential at said juncture.

4. In a transistorized multivibrator circuit, the combination comprising:
   a D.C. source;
   a first transistor having a collector, an emitter, and a base;
   a load resistor connected between said collector and said D.C. source;
   a second transistor having a collector, an emitter, and a base;
   a load resistor connected between said collector and said D.C. source;
   a feedback resistor connected between the base of said first transistor and the collector of said second transistor whereby said first transistor is cut off and said second transistor is conductive;
   a resistor connected between said emitters and said D.C. source;
   a timing circuit including a resistor and a capacitor connected in series between the collector of said first transistor and said D.C. source;
   a first double back-to-back zener diode connected between the collector of said first transistor and ground whereby the upper and lower potential levels of said collector and the upper and lower charge levels of said capacitor are fixed;

a second double back-to-back zener diode connected between the juncture of said resistor and said capacitor of said timing circuit and the base of said second transistor whereby said second transistor conducts when said second double back-to-back zener diode becomes conductive at a predetermined value of potential at said juncture;

means for coupling an input signal to the base of said first transistor whereby said first transistor is made conductive and said second transistor is cut off; and means for coupling an output signal from the collector of said second transistor, said output rising abruptly when said second transistor is cut off and dropping abruptly when said second transistor is made conductive, the duration of said output signal being consistently determined by the upper and lower charge limits of said capacitor.

References Cited by the Examiner
UNITED STATES PATENTS

| | | | |
|---|---|---|---|
| 2,879,412 | 3/1959 | Hoge et al. | 307—88.5 |
| 2,964,655 | 12/1960 | Mann | 307—88.5 |
| 3,025,417 | 3/1962 | Campbell | 307—88.5 |
| 3,028,507 | 4/1962 | Sachi | 307—88.5 |
| 3,046,418 | 7/1962 | Eachus | 307—88.5 |
| 3,061,799 | 10/1962 | Biard | 307—88.5 X |
| 3,061,800 | 10/1962 | Matzen | 307—88.5 X |
| 3,090,924 | 5/1963 | Seaton | 328—203 |
| 3,163,773 | 12/1964 | Cluwen | 307—88.5 |
| 3,173,025 | 3/1965 | Davidson | 307—88.5 |

ARTHUR GAUSS, *Primary Examiner.*

JOHN W. HUCKERT, *Examiner.*